United States Patent [19]

Gorski

[11] Patent Number: 4,825,342
[45] Date of Patent: Apr. 25, 1989

[54] VEHICLE HEADLAMP ASSEMBLY LOCATOR

[75] Inventor: William J. Gorski, Warren, Mich.

[73] Assignee: Chrysler Motors Corporation, Highland Park, Mich.

[21] Appl. No.: 199,835

[22] Filed: May 27, 1988

[51] Int. Cl.$^4$ .............................................. B60Q 1/00
[52] U.S. Cl. .................................... 362/61; 362/368; 362/457
[58] Field of Search .................. 362/61, 71, 80, 368, 362/370, 371, 277, 319, 269, 457

[56] References Cited

U.S. PATENT DOCUMENTS 4,066,884 1/1978 Taylor ................................ 362/277

FOREIGN PATENT DOCUMENTS 2626814 12/1976 Fed. Rep. of Germany ........ 362/61
3229728  5/1983 Fed. Rep. of Germany ........ 362/71

Primary Examiner—Stephen F. Husar
Assistant Examiner—Sue Hagarman
Attorney, Agent, or Firm—Edward A. Craig

[57] ABSTRACT

A vehicle headlamp assembly locator is provided for proper positionment of a vehicle headlamp assembly in a vehicle in alignment with the hood of the vehicle. The locator includes an elongated spacer element for determining the horizontal distance between a designated portion of the vehicle headlamp assembly and a forward portion of the vehicle hood. An upright spacer element is provided to position the elongated spacer element in the desired vertical position.

4 Claims, 2 Drawing Sheets

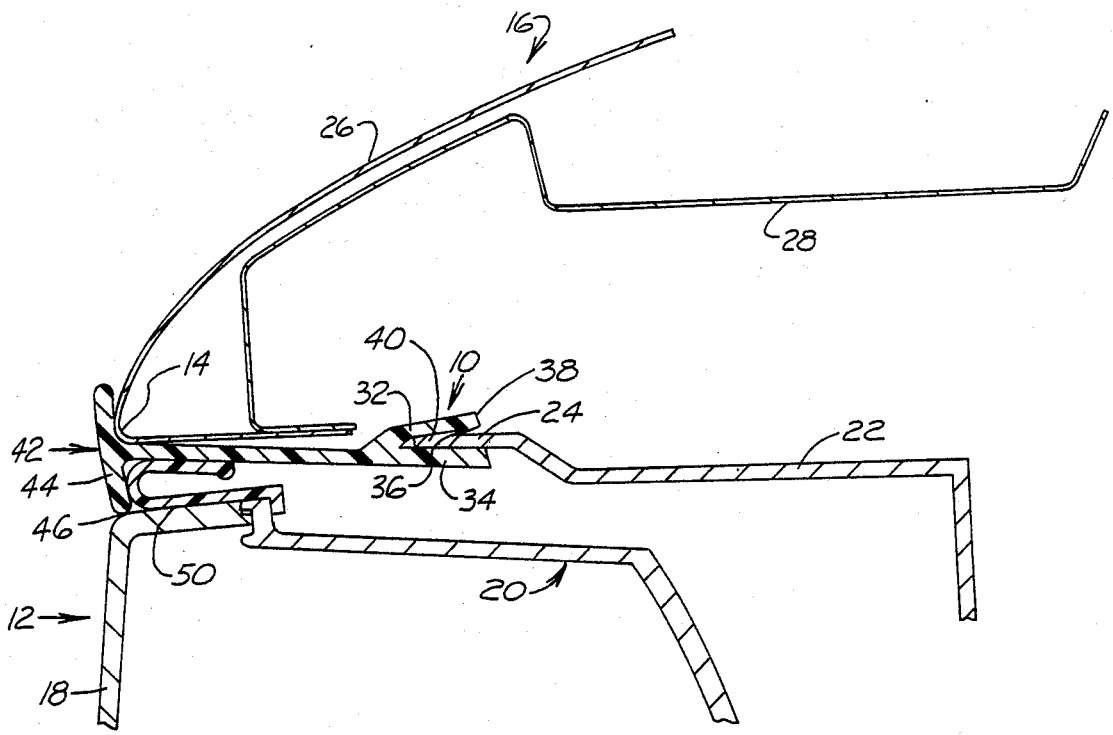
FIG.3
FIG.4
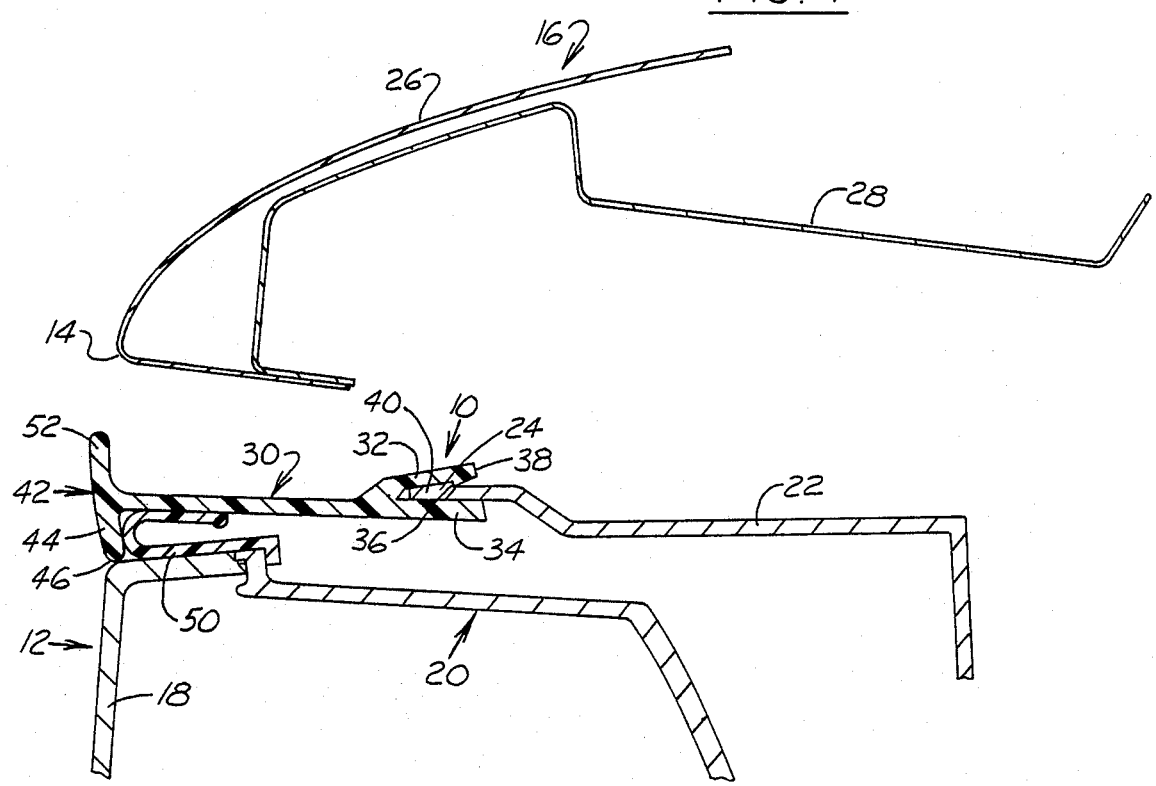

VEHICLE HEADLAMP ASSEMBLY LOCATOR

BACKGROUND OF THE INVENTION

1. Field of the Invention

A vehicle headlamp assembly locator is provided for positioning a vehicle headlamp assembly both vertically and horizontally with respect to the forward portion of the vehicle hood prior to securing the vehicle headlamp assembly in place on the vehicle.

2. Prior Art

The vehicle headlamp assembly locator of the present invention is provided for mounting a vehicle headlamp assembly onto a vehicle body. It is necessary that the forward or lens portion of the headlamp assembly be in alignment with the forward portion of the vehicle hood so that these elements will present a relatively continuous surface appearance. If the headlamp assembly is secured too far forwardly or too far rearwardly or too high or too low, an objectionable appearance results.

Conventionally, headlamp assemblies are mounted on a vehicle after the vehicle hood has been mounted. Proper positioning of the headlamp assembly has been achieved in the manufacturing process by means of a full-sized fixture. Such fixtures are used to properly locate the headlamp assemblies on the vehicle body. The fixtures are quite expensive. Additionally, the tolerance range and the accuracy of said fixtures is frequently not as close as desired. Further, such fixtures are bulky and heavy and difficult to handle. This latter point results in relatively inefficient use of the time of production workers.

In accordance with the present invention, a vehicle headlamp assembly locator is provided for mounting the headlamp assembly and does not require the use of a fixture for proper location of the headlamp assembly. This substantially reduces manufacturing costs and tends to improve the quality of the finished vehicle. The locator is a relatively inexpensive item and can be discarded after use or reused if desired.

SUMMARY OF THE INVENTION

A vehicle headlamp assembly locator for positioning a vehicle headlamp assembly both vertically and horizontally with respect to the forward portion of the vehicle hood prior to securing the vehicle headlamp assembly in place on the vehicle is provided. The locator comprises an elongated spacer element equal in length to the desired horizontal distance between a designated portion of the vehicle headlamp assembly and a forward portion of the vehicle hood. Fastening means are provided on the elongated spacer element for removably securing the elongated spacer element to the designated portion of the vehicle headlamp assembly.

An upright spacer element is carried on the forward end of the elongated spacer element. The upright spacer element has a downwardly extending portion for contacting the vehicle headlamp assembly when the elongated spacer element is fastened thereto to position the elongated spacer element at a desired vertical location with respect to the headlamp assembly. The upright spacer element also has an upwardly extending portion for contacting, along with the elongated spacer element, the forward portion of the vehicle hood to thereby position the vehicle headlamp assembly both vertically and horizontally with respect to the forward portion of the vehicle hood. The juncture of the upright spacer element upwardly extending portion and the elongated spacer element defines a surface area for positioning the vehicle headlamp assembly as aforesaid.

The rearward portion of the elongated spacer element is bifurcated and defines the fastening means. The bifurcated portion is receivable on the edge of a panel forming part of the vehicle headlamp assembly. The bifurcated portion defines two spaced apart prongs. At least one of the prongs has a catch adjacent the rearward end thereof for engagement with a protrusion on the panel to secure and position the locator in place.

IN THE DRAWINGS

FIG. 3 is a sectional view taken substantially along the line 3—3 of FIG. 1 looking in the direction of the arrows; and FIG. 4 is a view similar to FIG. 3 with the hood in a raised position.

DETAILED DESCRIPTION OF A PREFERRED EMBODIMENT

Figure 1:
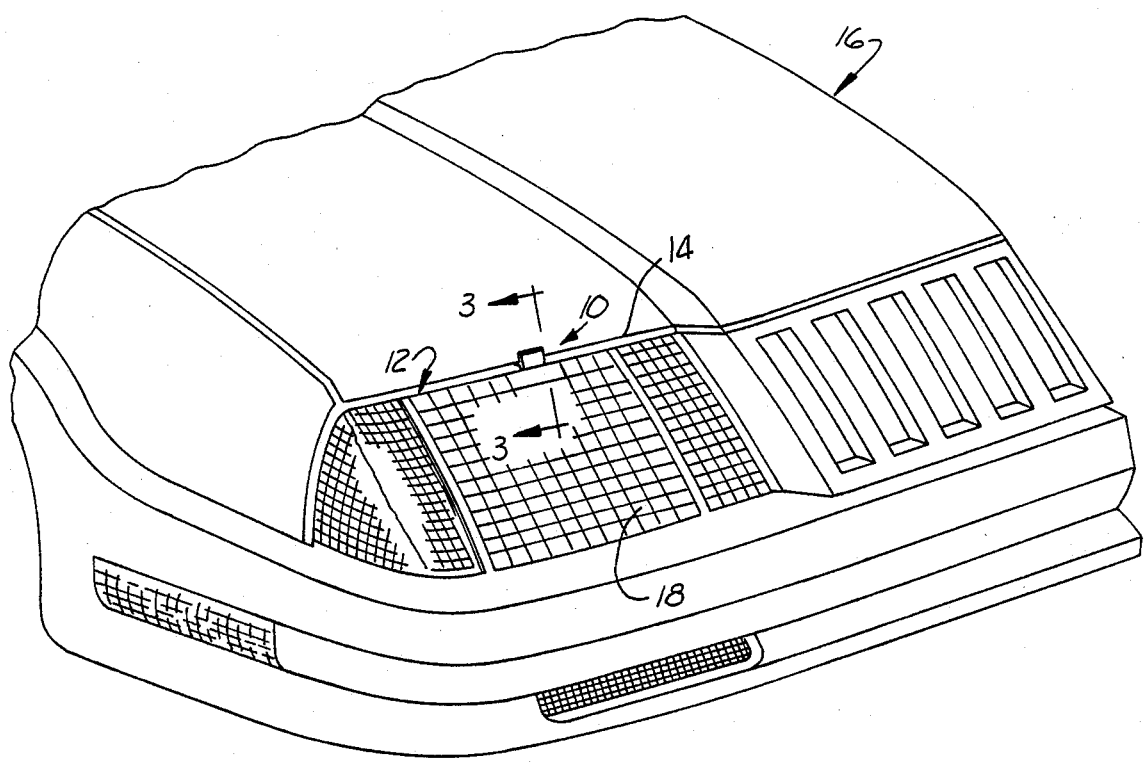
FIG. 1 is a perspective view of the forward portion of an automobile illustrating the vehicle headlamp assembly locator in position preparatory to mounting of the vehicle headlamp assembly in accordance with one embodiment of the present invention.
Figure 2:
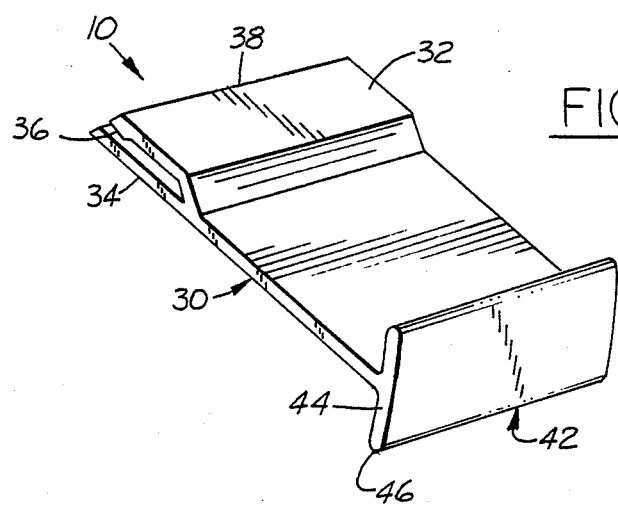
FIG. 2 is a view in perspective of the vehicle headlamp assembly locator in accordance with one embodiment of the present invention.

Referring to the figures, it will be noted that a vehicle headlamp assembly locator 10 is provided for positioning the vehicle headlamp assembly 12 both vertically and horizontally longitudinally with respect to the forward portion 14 of the vehicle hood 16.

The vehicle headlamp assembly 12 is of the type currently coming into use and referred to as an "aero headlamp". In this construction, the lens 18 is integral with the assembly casing 20. A sealed beam headlight is not used, rather a bulb (not shown) is plugged into the rear of the assembly and is sealed at its point of insertion from the atmosphere to provide the equivalent of a sealed beam headlamp. The advantage of such a construction is that the headlamp may be configured to conform to the contours of the vehicle. Bulbs are easily replaced at low cost. The headlamp assembly includes an outer adapter casing panel member 22 which is utilized in accordance with the present invention to properly mount the headlamp assembly. The panel member 22 includes an edge portion 24 which receives the locator 10. The edge portion 24 inherently has a specific, designated position with respect to the overall structure of the headlamp assembly 12 and thus provides structure for positioning the headlamp assembly. Other similar structure on the headlamp assembly may be employed for this purpose as desired.

The vehicle hood 16 comprises the standard outer panel member 26. Hood interior panel structures 28 are used as is conventional. The vehicle hood 16 is mounted on the vehicle prior to mounting of the vehicle headlamp assembly 12. Due to differences in body build dimensions, the headlamp assembly 12 cannot be secured in a specific place with reference to its mounting structure but must be positioned with respect to the position taken by the vehicle hood 16. The mounting structure for the vehicle headlamp assembly 12 normally includes slotted openings which permit shifting of the headlamp assembly as needed to provide for proper alignment with the vehicle hood. The structure for mounting the headlamp assembly is not shown inasmuch as this structure is conventional and has been in long use in connection with fixturing devices for mounting the headlamp assembly.

The locator 10 comprises an elongated spacer element 30 which is equal in length to the desired horizontal distance between a designated portion of the vehicle headlamp assembly (in this case, the edge portion 24) and the forward portion 14 of the vehicle hood 16. Fastening means are provided on the elongated spacer element 30 for removably securing the element 30 to the edge portion 24 of the vehicle headlamp assembly 12. As will be noted, the rearward portion of the elongated spacer element 30 is bifurcated and defines the fastening means. The bifurcated portion defines two spaced apart prongs 32, 34. At least one of the prongs 32 has a catch 36 adjacent the rearward end 38 thereof. The catch 36 is for engagement with a protrusion 40 provided on the edge portion 24. As will appreciated, when the catch 36 engages the protrusion 40, the locator 10 is removably secured in place and properly positioned with respect to the vehicle headlamp assembly. The locator 10 is preferably fabricated of an inexpensive plastic material so that it may be discarded or reused as desired. The locator 10 is mounted on the edge portion 24 by forcing the prongs 32, 34 over the edge portion. In order to achieve proper positioning of the locator 10, it should be pulled forwardly until the catch 36 engages the protuberance 40.

An upright spacer element 42 is carried on the forward end of the elongated spacer element 30. The upright spacer element 42 has a downwardly extending portion 44 for contacting the vehicle headlamp assembly 12 when the elongated spacer element 30 is fastened to the panel member 22. The downwardly extending portion 44 positions the elongated spacer element 30 at the desired vertical location with respect to the headlamp assembly 12. As will be noted, the lower edge 46 of the downwardly extending portion 44 contacts the headlamp lens 18. A sealing gasket 50 extends around the headlamp assembly and is externally visible. The gasket 50 nestles against the inner surface of the portion 44 and assists in positive positionment of this element.

The upright spacer element 42 has an upwardly extending portion 52 for contacting, along with the elongated spacer 30, the forward portion 14 of the vehicle hood 16 to thereby position the vehicle headlamp assembly 12 both vertically and horizontally with respect to the forward portion 14 of the hood. As will be noted, the area adjacent the juncture of the upright spacer element upwardly extending portion 52 and the elongated spacer element 30 defines a generally right angle surface, portions of which contact the forward portion 14 of the hood for the desired positioning function.

In operation, the locator 10 is first mounted on the vehicle headlamp assembly 12. This may be done prior to placing the assembly 12 in position beneath the hood 16. The assembly 12 is roughly mounted beneath the hood 16 with the hood in a raised position as shown in FIG. 4. The hood 16 is then lowered to the position illustrated in FIG. 3 with the assembly 12 being manipulated so that the contact of the forward portion 14 of the hood is as shown in FIG. 3 is made. After securement of the headlamp assembly 12 in place, the locator 10 is removed and either discarded or saved for future use.

I claim:

1. A vehicle headlamp assembly locator for positioning a vehicle headlamp assembly both vertically and horizontally longitudinally with respect to the forward portion of the vehicle hood prior to securing the vehicle headlamp assembly in place on the vehicle, the locator comprising an elongated spacer element equal in length to the desired horizontal longitudinally distance between a designated portion of the vehicle headlamp assembly and a forward portion of the vehicle hood, fastening means on the elongated spacer element for removably securing the elongated spacer element to the designated portion of the vehicle headlamp assembly, an upright spacer element carried on the forward end of the elongated spacer element, the upright spacer element having a downwardly extending portion for contacting the vehicle headlamp assembly when the elongated spacer element is fastened thereto to position the elongated spacer element at a desired vertical location with respect to the headlamp assembly, the upright spacer element having an upwardly extending portion for contacting, along with the elongated spacer element, the forward portion of the vehicle hood to thereby position the vehicle headlamp assembly both vertically and horizontally longitudinally with respect to the forward portion of the vehicle hood.

2. A vehicle headlamp assembly locator as defined in claim 1, further characterized in that the juncture of the upright spacer element upwardly extending portion and the elongated spacer element defines a generally right angle surface area for positioning the vehicle headlamp assembly with respect to the vehicle hood.

3. A vehicle headlamp assembly locator as defined in claim 1, further characterized in that the rearward portion of the elongated spacer element is bifurcated defining two spaced apart prongs which define said fastening means, said bifurcated portion being receivable on the edge of a panel forming part of the vehicle headlamp assembly.

4. A vehicle headlamp assembly locator as defined in claim 3, further characterized in that at least one of the prongs has a catch adjacent the rearward end thereof for the engagement with a protrusion on said panel to secure and position the locator in place.

* * * * *

UNITED STATES PATENT AND TRADEMARK OFFICE

Certificate

Patent No. 4,825,342            Patented: April 25, 1989

On petition requesting issuance of a certificate for correction of inventorship pursuant to 35 U.S.C. 256, it has been found that the above-identified patent, through error and without any deceptive intent, improperly sets forth the inventorship. Accordingly, it is hereby certified that the correct inventorship of this patent is:
William J. Gorski, David K. Lauzun and John A. DiGasbarro Signed and Sealed This 2nd Day of January 1990.

IRA S. LAZARUS

*Supervisory Patent Examiner*
*Art Unit 946*